United States Patent
Fujiyoshi et al.

(10) Patent No.: US 9,506,558 B2
(45) Date of Patent: Nov. 29, 2016

(54) VEHICLE CONTROL SYSTEM

(71) Applicant: TOYOTA JIDOSHA KABUSHIKI KAISHA, Toyota-shi, Aichi-ken (JP)

(72) Inventors: Tadashi Fujiyoshi, Susono (JP); Kazumi Hoshiya, Gotemba (JP); Yoshio Ito, Susono (JP); Norimi Asahara, Numazu (JP); Seiji Kuwahara, Susono (JP); Takahito Endo, Nagaizumi (JP); Kazuya Arakawa, Fujinomiya (JP)

(73) Assignee: TOYOTA JIDOSHA KABUSHIKI KAISHA, Aichi-ken (JP)

( * ) Notice: Subject to any disclaimer, the term of this patent is extended or adjusted under 35 U.S.C. 154(b) by 0 days.

(21) Appl. No.: 15/091,652

(22) Filed: Apr. 6, 2016

(65) Prior Publication Data

US 2016/0298758 A1   Oct. 13, 2016

(30) Foreign Application Priority Data

Apr. 8, 2015 (JP) ................. 2015-079378

(51) Int. Cl.
| | |
|---|---|
| *F16H 61/02* | (2006.01) |
| *F16H 59/50* | (2006.01) |
| *G05D 1/00* | (2006.01) |
| *B60Q 9/00* | (2006.01) |

(52) U.S. Cl.
CPC ............. *F16H 61/0204* (2013.01); *B60Q 9/00* (2013.01); *F16H 59/50* (2013.01); *G05D 1/0088* (2013.01)

(58) Field of Classification Search
CPC ..... F16H 61/0204; F16H 59/50; B60Q 9/00; G05D 1/0088
USPC .......................................................... 701/23
See application file for complete search history.

(56) References Cited

U.S. PATENT DOCUMENTS

| | | | | |
|---|---|---|---|---|
| 5,627,767 | A * | 5/1997 | Gabiniewicz | G01L 5/22 701/102 |
| 7,164,117 | B2 * | 1/2007 | Breed | B60R 21/01516 250/208.1 |
| 2003/0135321 | A1 * | 7/2003 | Kumazaki | B60K 28/02 701/112 |
| 2005/0046584 | A1 * | 3/2005 | Breed | B60C 11/24 340/13.31 |
| 2005/0131607 | A1 * | 6/2005 | Breed | B60N 2/002 701/45 |
| 2006/0208169 | A1 * | 9/2006 | Breed | B60N 2/002 250/221 |
| 2007/0135984 | A1 * | 6/2007 | Breed | B60R 21/01516 701/45 |
| 2008/0036187 | A1 * | 2/2008 | Breed | B60R 21/01516 280/735 |
| 2013/0207773 | A1 * | 8/2013 | Hathaway | B60K 28/12 340/3.43 |
| 2016/0076645 | A1 * | 3/2016 | Terai | F16H 59/50 701/58 |

FOREIGN PATENT DOCUMENTS

| | | |
|---|---|---|
| JP | 2011-235709 A | 11/2011 |
| JP | 2012-51441 A | 3/2012 |

\* cited by examiner

*Primary Examiner* — McDieunel Marc
*Assistant Examiner* — James E Stroud
(74) *Attorney, Agent, or Firm* — Sughrue Mion, PLLC

(57) ABSTRACT

A vehicle control system to prevent a vehicle stopped in the autonomous mode from being started undesirably is provided. The vehicle control system is configured to select an operating mode from an autonomous mode and a manual mode, and to select a drive range from a drivable range and a non-drivable range. A controller is configured to detect a fact that a door is opened, that a door lock is unlocked, or that a seatbelt is unfastened. If at least any of those facts is detected, the controller shifts the drive range to the non-drivable range or shifts the operating mode to the manual mode.

2 Claims, 3 Drawing Sheets

VEHICLE CONTROL SYSTEM

CROSS REFERENCE TO RELATED APPLICATIONS

The present invention claims the benefit of priority to Japanese Patent Application No. 2015-079378 filed on Apr. 8, 2015 with the Japanese Patent Office, the entire contents of which are incorporated herein by reference in its entirety.

BACKGROUND

Field of the Invention

Embodiments of the present invention relates to the art of a vehicle control system configured to switch an operating mode of a vehicle between manual mode and autonomous mode.

Discussion of the Related Art

JP-A-2011-235709 describes a vehicle control system configured to avoid an accident in every situation. To this end, the control system taught by JP-A-2011-235709 is configured to avoid the danger based on information from a plurality of devices. According to the teachings of JP-A-2011-235709, for example, the control system alerts the driver when a vehicle door is unlocked under a condition that a shift position is shifted to a position other than parking position, when the vehicle door is unlocked at a speed higher than a predetermined speed, and when a door of driver's seat is unlocked under a condition that the shift position is shifted to a position other than parking position or neutral position.

JP-A-2012-51441 describes an automatic operation vehicle control device configured to shift an operating mode between manual mode and an automatic mode. According to the teachings of JP-A-2012-51441, the operating mode is shifted from the manual mode to the automatic mode if a difference between an actual travel course and a target travel course is less than threshold value, and a manual operation of driver (i.e., and override) is not detected during automatic running.

The control system taught by JP-A-2011-235709 is applied to a conventional vehicle that is operated manually. The conventional vehicle can be stopped certainly by the driver if the driver is alerted by the control system taught by JP-A-2011-235709. However, the self-driving car as taught by JP-A-2012-51441 may not be stopped promptly or certainly even if the driver is alerted when the door is unlocked. For this reason, the conventional self-driving car may be started autonomously even in an unsuitable situation to start the vehicle.

SUMMARY

Aspects of the present application have been conceived noting the foregoing technical problems, and it is therefore an object of the present application is to provide a vehicle control system configured to prevent a vehicle stopped in the autonomous mode from being started undesirably.

The present invention relates to a vehicle control system that is configured to select an operating mode of a vehicle from an autonomous mode in which the vehicle is operated autonomously and a manual mode in which the vehicle is operated manually by a driver, and to select a drive range of the vehicle from a drivable range and a non-drivable range. In order to achieve the above-explained objective, according to the preferred embodiment, the vehicle control system is provided with a controller that controls an operating condition of the vehicle. Specifically, the controller is configured to detect at least any one of the facts that a door is opened, that a door lock is unlocked, and that a seatbelt is unfastened. In addition, the controller is configured to shift at least any of the drive range and the operating mode to the non-drivable range or to the manual mode, if at least any one of the facts that the door is opened, that the door lock is unlocked, and that the seatbelt is unfastened is determined while the vehicle is stopped under the autonomous mode.

In a non-limiting embodiment, the controller is further configured to alert a passenger in such a manner not to get out of the vehicle if at least any one of the facts that the door lock is unlocked and that the seatbelt is unfastened is determined while the vehicle is stopped under the autonomous mode. In addition, the controller is further configured to shift at least any of the drive range and the operating mode to the non-drivable range or to the manual mode if the passenger opens the door in spite of being alerted.

Thus, according to the preferred embodiment, the drive range is shifted to the non-drivable range or the autonomous mode is terminated so that the operating mode is shifted to the manual mode to inhibit an automatic start of the vehicle, if a motion of the passenger to get out of the vehicle is detected, for example, if the door is opened, the door lock is unlocked, or the seatbelt is unfastened. According to the preferred embodiment, therefore, the vehicle can be prevented from being started undesirably.

According to the preferred embodiment, optionally, the passenger may be alerted in such a manner not to get out of the vehicle if the door lock is unlocked or if the seatbelt is unfastened while the vehicle is stopped under the autonomous mode. In this situation, if the passenger still tries to open the door in spite of being alerted, the drive range is shifted to the non-drivable range or the operating mode is shifted to the manual mode. According to the preferred embodiment, therefore, the vehicle can be prevented from being started certainly when the passenger is getting out of the vehicle.

BRIEF DESCRIPTION OF THE DRAWINGS

Features, aspects, and advantages of exemplary embodiments of the present invention will become better understood with reference to the following description and accompanying drawings, which should not limit the invention in any way.

DETAILED DESCRIPTION OF THE PREFERRED EMBODIMENT(S)

Figure 1:
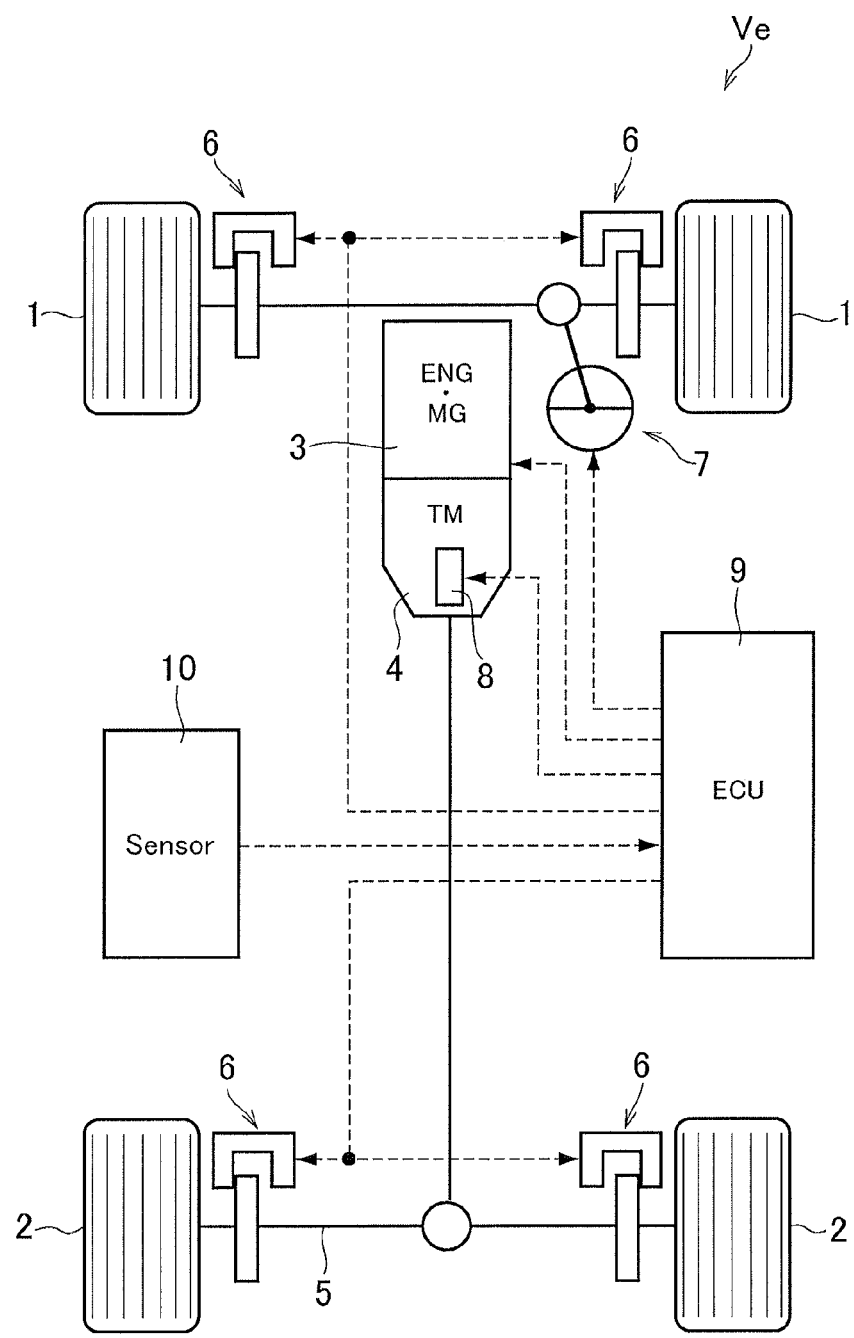
FIG. 1 is a schematic illustration showing the control system of the vehicle to which the control system according to the preferred embodiment is applied.

Preferred embodiments of the present application will now be explained with reference to the accompanying drawings. Referring now to FIG. 1, there is shown an example of a vehicle Ve to which the control system according to the preferred embodiment is applied. An operating mode of the vehicle Ve may be shifted between manual mode in which the vehicle Ve is operated manually by a driver and autonomous mode in which the vehicle Ve is operated autonomously. In the autonomous mode, the vehicle Ve is operated autonomously in line with a below-explained travel plan.

The vehicle Ve shown in FIG. 1 is a rear-wheel-drive vehicle comprising a pair of front wheels 1 and a pair of rear wheels 2. In the vehicle Ve, power of a prime mover 3 such as an engine and a motor-generator (referred to as "ENG" and "MG" in FIG. 1) is delivered to the rear wheels 2 through a transmission (referred to as "TM" in FIG. 1) 4 and a driveshaft 5 to propel the vehicle Ve, and a steering device 7 is connected to the front wheels 1. Here, it is to be noted that the control system may also be applied to a front-wheel-drive vehicle in which power of the prime mover 3 is delivered to the front wheels 1, and to a four-wheel-drive vehicle in which power of the prime mover 3 is delivered to both front wheels 1 and rear wheels 2.

For example, if an engine is used as the prime mover 3 to propel the vehicle Ve, the engine is started and stopped electrically, and output power thereof is also adjusted electrically. Specifically, given that a gasoline engine is used as the prime mover 3, an opening degree of a throttle valve, an amount of fuel supply, a commencement and a termination of ignition, an ignition timing etc. are controlled electrically. A permanent magnet type synchronous motor having a generating function, that is, a motor-generator may also be used as the prime mover 3. In this case, the prime mover 3 is connected with a battery (not shown) through an inverter (not shown) to control a rotational speed and a torque thereof so that the prime mover 3 can be operated selectively as a motor and a generator responsive to a current applied thereto.

As to the transmission 4, for example, a conventional geared automatic transmission, a belt-driven continuously variable transmission, a toroidal continuously variable transmission etc. may be used as the transmission 4. Given that the vehicle Ve is a hybrid vehicle, the transmission 4 includes a power distribution device for distributing and synthesizing powers of the engine and the motor(s).

Each brake device 6 is actuated by a brake actuator (not shown) to apply a braking force to the front wheels 1 and the rear wheels 2. That is, the braking force applied to the front wheels 1 or the rear wheels 2 is controlled by controlling actuation of the brake actuator.

The steering device 7 is adapted to turn the front wheels 1 of the vehicle Ve, and according to the preferred embodiment, the steering device 7 is provided with an electric power steering mechanism for assisting a steering power by an electric assist motor. Specifically, a steering angle of the front wheels 1 is controlled by actuating a steering actuator by the assist motor of the power steering mechanism.

A shifting device 8 is adapted to shift an operating mode of the vehicle Ve among a forward stage, a reverse stage and a neutral stage. Specifically, a drive range of the shifting device 8 can be selected from Drive range where the vehicle Ve is propelled in the forward direction within a predetermined range of speed ratio or gear stage, Low range where the vehicle Ve is propelled in the forward direction under the low stage (i.e., the first stage) or with the maximum speed ratio, Second range where the vehicle Ve is propelled in the forward direction while shifting the gear stage from the first stage to the second stage, and Reverse range where the vehicle Ve is propelled in the backward direction, Neutral range where power transmission from the prime mover 3 is interrupted, and Parking range where the driveshaft 5 is halted by a parking lock (not shown).

In order to select the drive range manually by the driver, the shifting device 8 is provided with a shift lever or a shift switch. In addition, in order to activate the transmission 4 in accordance with the selected drive range, the shifting device 8 is further provided with a shifting actuator. Alternatively, the drive range of the vehicle Ve may also be shifted automatically by controlling the shifting actuator.

In order to integrally control the prime mover 3, the transmission 4, the brake device 6, the steering device 7, and the shifting device 8, the vehicle Ve is further provided with a controller (referred to as "ECU" in FIG. 1) 9 as an electronic control unit composed mainly of a microcomputer. Specifically, detection signals and information from sensors 10 including on-board units are sent to the controller 9. Although only one controller is depicted in FIG. 1, a plurality of controllers 9 may be arranged in the vehicle Ve to control the above-listed devices individually.

Specifically, the sensor 10 includes an accelerator sensor for detecting an opening degree of an accelerator, a brake sensor (or switch) for detecting a depression of a brake pedal, a steering sensor for detecting a steering angle of the steering device 7, an engine speed sensor for detecting a speed of the engine, an output speed sensor for detecting a speed of an output shaft of the transmission 4, a vehicle speed sensor for detecting rotational speeds of the front wheels 1 and the rear wheels 2, a longitudinal acceleration sensor for detecting a longitudinal acceleration of the vehicle Ve, a lateral acceleration sensor for detecting a lateral acceleration of the vehicle Ve, a yaw rate sensor for detecting a yaw rate of the vehicle Ve, a door sensor for detecting an opening state of the door, a door lock sensor for detecting a locking state of a door lock, a seat belt sensor for detecting a fastening state of a seat belt, a shift sensor for detecting a shift position of the shifting device 8 and so on.

In addition, the sensor 10 further includes at least one of the following external sensors for detecting an external condition, such as an on-board camera, a RADAR (i.e., a radio detection and ranging) a LIDAR (i.e., a laser imaging detection and ranging).

Specifically, the on-board camera is arranged inside of a windshield glass, and transmits recorded information about the external condition to the controller 9. To this end, not only a monocular camera but also a stereo camera having a plurality of lenses and image sensors to achieve a binocular vision may be used as the on-board camera. If the stereo camera is used as the on-board camera, the controller 9 is allowed to obtain three-dimensional information in the forward direction.

The RADAR is adapted to detect obstacles utilizing radio waves such as millimetric-waves and microwaves, and to transmit detected information to the controller 9. Specifically, the RADAR detects an obstacle such as other vehicle and so on by emitting radio waves and analyzing the radio waves reflected from the obstacle.

Likewise, the LIDAR is adapted to detect obstacles utilizing laser light and to transmit detected information to the controller 9. Specifically, the LIDAR detects an obstacle such as other vehicle and so on by emitting laser light and analyzing the laser light reflected from the obstacle.

In addition, the vehicle Ve is further provided with a GPS (i.e., global positioning system) receiver, a digital map database, and a navigation system. Specifically, the GPS receiver is adapted to obtain a position (i.e., latitude and longitude) based on incident signals from GPS satellites, and to transmit the positional information to the controller 9. The digital map database may be installed in the controller 9, but map information stored in external online information processing systems may also be available. The navigation system is configured to determine a travelling route of the vehicle Ve based on the positional information obtained by the GPS receiver and the map database.

The controller 9 carries out calculations based on the incident data or information from the sensor 10 and preinstalled data, and calculation results are sent in the form of command signal to the prime mover 3 and the transmission 4, and to the actuators of the brake device 6, the steering device 7, the shifting device 8 and so on.

In order to operate the vehicle Ve autonomously, the vehicle Ve is provided with a throttle actuator, a brake actuator, a steering actuator, a shifting actuator and so on. Specifically, the throttle actuator is adapted to change an opening degree of the throttle valve or an electric power supplied to the motor in response to reception of the command signal. The brake actuator is adapted to actuate the brake device 8 to control braking force applied to the wheels 2 and 3 in response to reception of the command signal. The steering actuator is adapted to activate the assist motor of the steering device to control a steering torque in response to reception of the command signal. The shifting actuator is adapted to actuate the shifting device 8 to select a desired drive range in response to reception of the command signal.

The controller 9 comprises a position recognizer, an external condition recognizer, a running condition recognizer, a travel plan creator, and a travel controller.

Specifically, the position recognizer is configured to recognize a current position of the vehicle Ve on the map based on the positional information received by the GPS receiver and the map database. The current position of the vehicle Ve may also be obtained from the positional information used in the navigation system. Optionally, the vehicle Ve may also be adapted to communicate with external sensors arranged along the road to obtain the current position of the vehicle Ve.

The external condition recognizer is configured to recognize external condition of the vehicle Ve such as a location of a traffic lane, a road width, a road configuration, a road gradient, an existence of obstacles around the vehicle Ve and so on, based on the recorded information of the on-board camera, or detection data of the RADAR or the LIDAR. Optionally, weather information, a friction coefficient of road surface etc. may be obtained according to need.

The running condition recognizer is configured to recognize running condition of the vehicle Ve such as a vehicle speed, a longitudinal acceleration, a lateral acceleration, a yaw rate and so on based on detection result of the internal sensors.

The travel plan creator is configured to create a travel locus of the vehicle Ve based on a target course determined by the navigation system, a position of the vehicle Ve recognized by the position recognizer, and an external condition recognized by the external condition recognizer. That is, the travel plan creator creates a travel locus of the vehicle Ve within the target course in such a manner that the vehicle Ve is allowed to travel safely and properly while complying traffic rules.

In addition, the travel plan creator is further configured to create a travel plan in line with the created travel locus. The travel plan creator creates a travel plan in line with the target course based on the recognized external conditions and the map database.

Specifically, the travel plan is created based on prospective data after few seconds from the present moment to determine a future condition of the vehicle Ve such as a driving force or the like required in future. Optionally, the travel plan may also be created based on prospective data after several ten seconds depending on the external conditions and the running conditions. Thus, the travel plan creator creates a future plan to change a vehicle speed, acceleration, steering torque etc. during travelling along the target course in the form of e.g., a map.

Alternatively, the travel plan creator may also create a pattern to change the vehicle speed, acceleration, steering torque etc. between predetermined points on the travel locus. Specifically, such patterns may be determined by setting target values of those parameters at each point on the travel locus taking account of a required time to reach the point at the current speed.

The travel controller is configured to operate the vehicle Ve autonomously in line with the travel plan created by the travel plan creator. To this end, specifically, the travel controller transmits command signals to the throttle actuator, the brake actuator, the steering actuator, the shifting actuator and so on in accordance with the travel plan.

In order to prevent the vehicle Ve stopped under the autonomous mode from being started undesirably while the passenger(s) is/are getting into or getting out of the vehicle Ve, the vehicle control system according to the preferred embodiment is configured to carry out the following controls.

Figure 2:
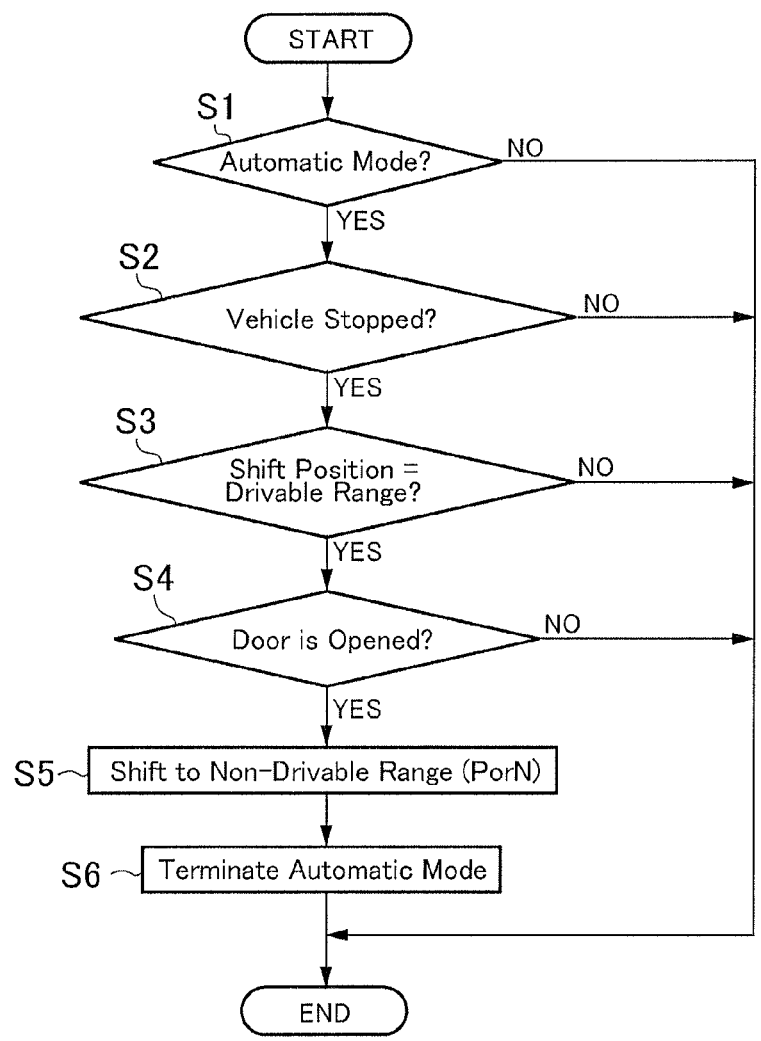
FIG. 2 is a flowchart showing a control example carried out by the control system.

Turning to FIG. 2, there is shown a control example to be carried out when the vehicle Ve is stopped during the autonomous mode. First of all, it is determined at step S1 whether or not the vehicle Ve is operated under the autonomous mode.

If the vehicle Ve is operated under the manual mode so that the answer of step S1 is NO, the routine is returned without carrying out any specific controls.

By contrast, if the vehicle Ve is operated under the autonomous mode so that the answer of step S1 is YES, the routine advances to step S2 to determine whether or not the vehicle Ve is being stopped based on a current vehicle speed. Specifically, if the current vehicle speed is lower than a predetermined reference speed, the controller 9 determines a fact that the vehicle is stopped.

If the vehicle Ve is running at a speed higher than the reference speed so the answer of step S2 is NO, the routine is also returned without carrying out any specific controls.

By contrast, if the vehicle Ve is being stopped so that the answer of step S2 is YES, the routine advances to step S3 to determine whether or not the shift position is situated at a position to establish a drivable range where the vehicle Ve can be driven by the prime mover 3 including the Drive range, the Low range, the Second range, and the Reverse range based on the detection data of the shift sensor.

If the shift position has already been shifted to a position to establish a non-drivable range such as the Neutral range and the Parking range where the vehicle Ve cannot be driven by the prime mover 3 so that the answer of step S3 is NO, the routine is also returned without carrying out any specific controls.

By contrast, if the shift position is situated at the position to establish the drivable range so that the answer of step S3 is YES, the routine advances to step S4 to determine whether or not a preliminary action to get out of the vehicle Ve is taken by the passenger. At step S4, for example, it is determined whether or not the door is opened, the door lock is unlocked, or the seatbelt is unfastened, based on the detection data of the door sensor, the door lock sensor or the seatbelt sensor. Here, in FIG. 2, only the determination of opening state of the door is indicated for the sake of illustration.

If none of the above-mentioned preliminary actions is taken by the passenger so that the answer of step S4 is NO, the routine is also returned without carrying out any specific controls.

By contrast, if at least any one of the above-mentioned preliminary actions is taken by the passenger so that the answer of step S4 is YES, the routine advances to step S5. In this case, the controller 9 determines a fact that the passenger is in motion to get out of the vehicle Ve. If the vehicle Ve is started autonomously in this situation, the passenger may be upset and subjected to danger. In order to avoid such situation, at step S5, the shift position is shifted to the position at which the non-drivable range such as the Neutral range and the Parking range is established thereby preventing the vehicle Ve from being driven by the prime mover 3.

Then, at step S6, the autonomous mode is terminated so that the operating mode is shifted to the manual mode. Consequently, the vehicle Ve being stopped is inhibited to be started autonomously. In other words, the vehicle Ve being stopped is inhibited to be started unexpectedly if the passenger is expected to get out of the vehicle Ve. Then, the routine is returned.

Here, it is to be noted that the steps S5 and S6 may be carried out simultaneously or in the opposite order. Alternatively, any one of steps S5 and S6 may be omitted. However, an unexpected sudden starting of the vehicle resulting from a false operation can be prevented more certainly after shifting the operating mode to the manual mode by thus carrying out both steps S5 and S6.

Figure 3:
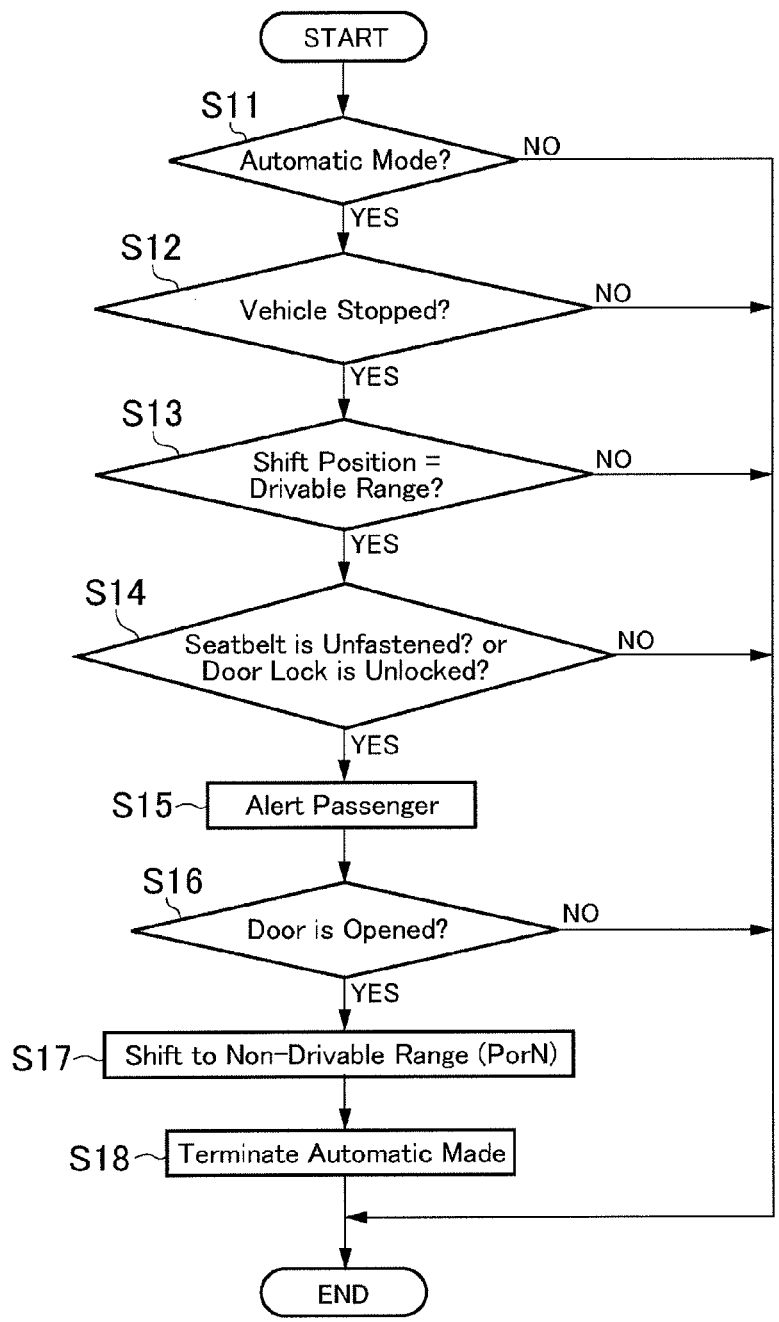
FIG. 3 is a flowchart showing another control example of the control carried out by the control system.

Turning now to FIG. 3, there is shown another control example to be carried out when the vehicle Ve is stopped under the autonomous mode. First of all, it is determined at step S11 whether or not the vehicle Ve is operated under the autonomous mode.

If the vehicle Ve is operated under the manual mode so that the answer of step S11 is NO, the routine is returned without carrying out any specific controls.

By contrast, if the vehicle Ve is operated under the autonomous mode so that the answer of step S11 is YES, the routine advances to step S12 to determine whether or not the vehicle Ve is being stopped.

If the vehicle Ve is running so the answer of step S12 is NO, the routine is also returned without carrying out any specific controls.

By contrast, if the vehicle Ve is being stopped so that the answer of step S12 is YES, the routine advances to step S13 to determine whether or not the shift position is situated at a position to establish the drivable range.

If the shift position has already been shifted to the position to establish the non-drivable range such as the Neutral range and the Parking range so that the answer of step S13 is NO, the routine is also returned without carrying out any specific controls.

By contrast, if the shift position is situated at the position to establish the drivable range so that the answer of step S13 is YES, the routine advances to step S14 to determine whether or not the door lock is unlocked or the seatbelt is unfastened by the passenger.

If none of the above-mentioned actions is taken by the passenger so that the answer of step S14 is NO, the routine is also returned without carrying out any specific controls.

By contrast, if at least any one of the above-mentioned actions is taken by the passenger so that the answer of step S14 is YES, the routine advances to step S15. In this case, the passenger is alerted not to get out of the vehicle Ve. At step S15, for example, the controller 9 sounds an alarm or announces to the passenger to keep the passenger from getting out of the vehicle Ve. Alternatively, the controller 9 lights or blinks a warning light, or indicates a warning message.

Normally, the door lock is unlocked or the seatbelt is unfastened before the passenger opens the door. According to another control example, therefore, execution of any of such preliminary actions to get out of the vehicle Ve is determined at step S14. If at least any one of the preliminary actions is taken by the passenger so that the answer of step S14 is YES, the controller 9 assumes a fact that the passenger is in motion to get out of the vehicle Ve. In this case, therefore, the passenger is alerted at step S15 to be prevented from getting get out of the vehicle Ve.

After thus alerting the passenger at step S15, then, it is determined at step S16 whether or not the door is opened by the passenger.

If the door is not opened by the passenger so that the answer of step S16 is NO, the routine is also returned without carrying out any specific controls.

By contrast, if the door is opened by the passenger so that the answer of step S16 is YES, the routine advances to step S17. That is, if the door is opened by the passenger even if the passenger is alerted at step S15, the controller 9 determines a fact that the passenger is in motion to get out of the vehicle Ve. In this situation, therefore, the shift position is shifted to the position at which the non-drivable range such as the Neutral range and the Parking range is established thereby preventing the vehicle Ve from being driven by the prime mover 3.

Then, at step S18, the autonomous mode is terminated so that the operating mode is shifted to the manual mode. Consequently, the vehicle Ve being stopped is inhibited to be started autonomously. In other words, the vehicle Ve being stopped is inhibited to be started unexpectedly if the passenger is expected to get out of the vehicle Ve. Then, the routine is returned.

Although the above exemplary embodiments of the present application have been described, it will be understood by those skilled in the art that the present application should not be limited to the described exemplary embodiments, and various changes and modifications can be made within the spirit and scope of the present application. For example, a layout of the vehicle to which the control system according to the preferred embodiment is applied may be altered arbitrarily according to need.

What is claimed is:

1. A vehicle control system that is configured to select an operating mode of a vehicle from an autonomous mode in which the vehicle is operated autonomously and a manual mode in which the vehicle is operated manually by a driver, and to select a drive range of the vehicle from a drivable range and a non-drivable range, comprising:
   a controller that controls an operating condition of the vehicle;
   wherein the controller is configured to detect at least any one of the facts that a door is opened, that a door lock is unlocked, and that a seatbelt is unfastened; and
   wherein the controller is configured to shift at least any of the drive range and the operating mode to the non-drivable range or to the manual mode, if at least any one of the facts that the door is opened, that the door lock is unlocked, and that the seatbelt is unfastened is determined while the vehicle is stopped under the autonomous mode.

2. The vehicle control system as claimed in claim 1, wherein the controller is further configured:
   to alert a passenger in such a manner not to get out of the vehicle if at least any one of the facts that the door lock is unlocked and that the seatbelt is unfastened is determined while the vehicle is stopped under the autonomous mode; and to shift at least any of the drive range and the operating mode to the non-drivable range or to the manual mode if the passenger opens the door in spite of being alerted.

* * * * *